United States Patent [19]

Axelrod

[11] 4,214,828

[45] Jul. 29, 1980

[54] WEB CASSETTE WITH CARTRIDGE LOAD

[75] Inventor: Donald J. Axelrod, Glenview, Ill.

[73] Assignee: Bell & Howell Company, Chicago, Ill.

[21] Appl. No.: 12,623

[22] Filed: Feb. 16, 1979

Related U.S. Application Data

[63] Continuation of Ser. No. 793,621, May 4, 1977, Pat. No. 4,153,361.

[51] Int. Cl.$^2$ ............................................. G03B 17/26
[52] U.S. Cl. .................................................... 354/275
[58] Field of Search .................. 354/203, 275; 355/18; 352/78 R; 242/71.1, 71.2, 55.13, 199

[56] References Cited

U.S. PATENT DOCUMENTS

| | | | |
|---|---|---|---|
| 1,318,966 | 10/1919 | Clardy | 354/203 |
| 1,751,593 | 3/1930 | Merle | 242/71.2 |
| 1,829,332 | 10/1931 | Beck | 354/203 |
| 1,871,233 | 8/1932 | Proctor | 242/71.2 |
| 2,011,624 | 8/1935 | Della Gana | 242/71.2 |
| 2,756,940 | 7/1956 | Lessler | 242/71.2 |
| 3,150,840 | 9/1964 | Briskin et al. | 242/55.13 |
| 3,169,721 | 2/1965 | Laa et al. | 242/55.13 |
| 3,252,370 | 5/1966 | Luther | 354/203 X |
| 3,379,108 | 4/1968 | Beyer et al. | 354/203 |
| 3,384,318 | 5/1968 | Nerwin et al. | 242/71.1 |
| 3,701,495 | 10/1972 | Holliday | 242/71.1 |
| 3,883,090 | 5/1975 | Hall | 242/199 |

FOREIGN PATENT DOCUMENTS

| | | | |
|---|---|---|---|
| 1410051 | 7/1965 | France | 354/275 |
| 14490 | of 1908 | United Kingdom | 354/275 |
| 398894 | 9/1933 | United Kingdom | 352/78 R |

*Primary Examiner*—Donald A. Griffin
*Attorney, Agent, or Firm*—Alan B. Samlan

[57] ABSTRACT

A web cassette has a carrier plate with a supply and take up cartridges mounted thereon. The web is pulled from a reel in the supply cartridge, led over a path including guide posts or rollers, and connected to a reel in the take-up cartridge. A V-tooth coupler on each of these reels interfaces with driven V-tooth couplers on a machine using the cassette to transport the web from the supply to the take-up cartridge. When the transport is completed, the take-up cartridge is removed for processing, the former supply cartridge is moved to the take-up position on the cassette, and a new supply cartridge is mounted on the cassette.

7 Claims, 5 Drawing Figures

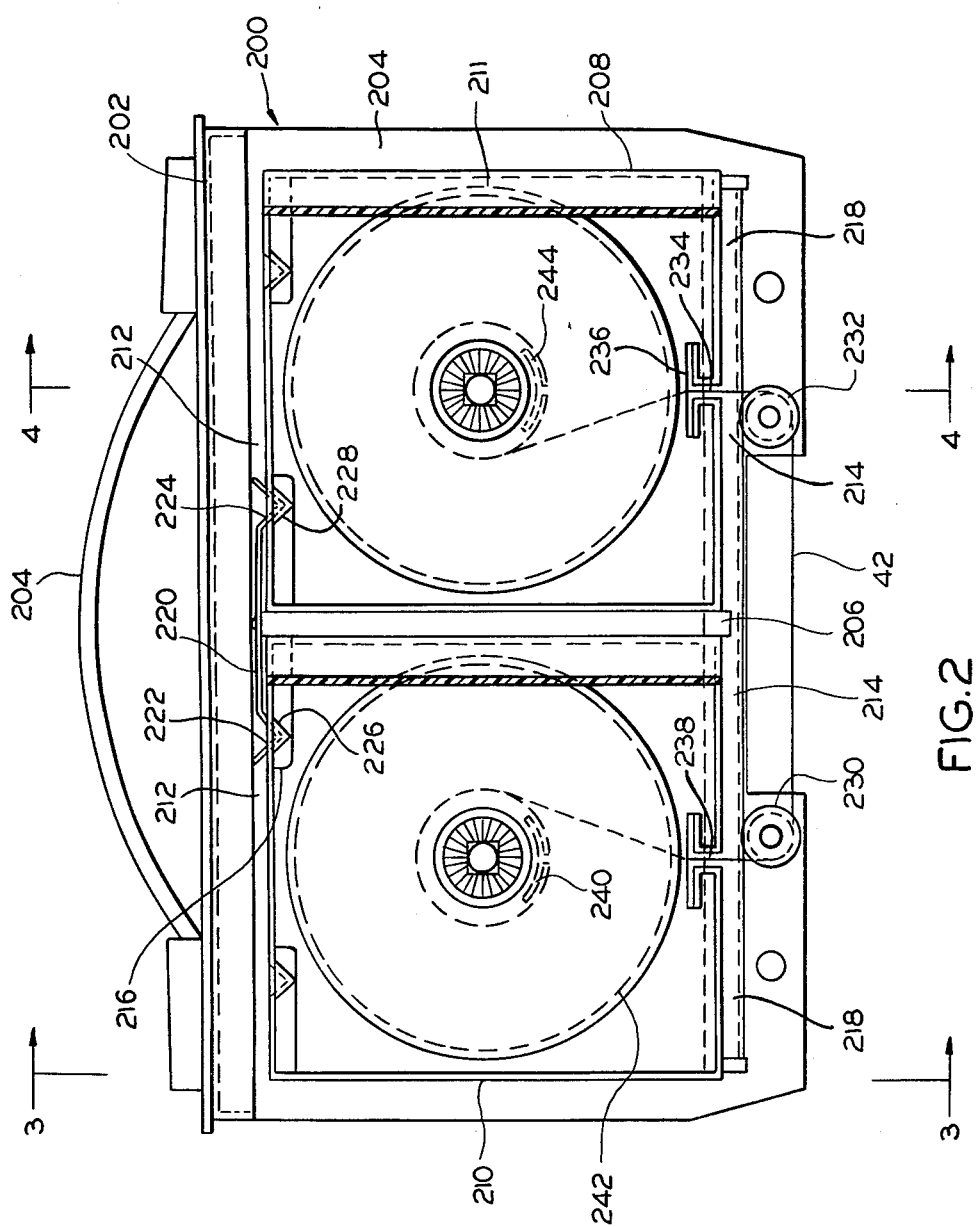

WEB CASSETTE WITH CARTRIDGE LOAD

This is a continuation of application Ser. No. 793,621, filed May 4, 1977 and now U.S. Pat. No. 4,153,361 issued May 8, 1979.

This invention relates to web loading devices and more particularly to pre-loaded cassettes for loading a web into a machine.

One example of a machine using pre-loaded cassettes for loading a web is found in a copending application entitled "Automatic Microfilm Camera", Ser. No. 821,279 filed Aug. 3, 1977 now U.S. Pat. No. 4,418,579 issued Apr. 10, 1979 by Donald Axelrod and J. Robert Flint, inventor, and assigned to the assignee of this application.

The invention finds utility whenever it is necessary or desirable to load and transport a web which may be exhausted. Therefore, it is not necessarily limited to use in cameras or any other particular device; however, it is actually used in the structure shown and described in the above-identified co-pending application. Accordingly, reference may be had to that application for more details concerning the utilization of the invention. To facilitate the comparison, some of the reference numerals used herein are the same as those used in the co-pending application.

In general, as used herein, a cartridge is a shell, housing, or other device containing a web. The cartridge may be a supply cartridge, in which case it contains a fresh web supply (such as unexposed film, for example). The cartridge may also be a take-up cartridge, in which case it contains a web which has been drawn from the supply and at least partially processed (such as exposed, but undeveloped film, for example). A cassette is a device having both a supply and a take-up in a single unit. According to this terminology, the invention provides a cassette having a supply and a take-up cartridge mounted thereon. When the supply is exhausted, the take-up cartridge is removed from the cassette, the former supply cartridge is moved to the take-up position on the cassette and a new supply cartridge is mounted on the cassette.

There are several problems connected with web cassette and cartridge loaded devices. First, a disposable cassette or cartridge should be so inexpensive that it does not add any significant costs to the web material loaded into it. Second, the web must feed evenly with uniform tension and without snagging, jamming, bagging, or breaking. Third, it should be easy to load and unload the cassette or cartridge into the machine for using the web material. Fourth, the interface between the cassette or cartridge and its associated machine must be quite reliable so that there is no mechanical misalignment or malfunction.

Generally, the prior art has provided a large variety of cassettes or cartridges; however, they have tended to fail to solve all of the above-identified problems in a satisfactory manner.

Yet another problem has centered about the security of the web. For example, if the web is unexposed or undeveloped film, it is essential that the cassettes or cartridges are absolutely light-tight.

Accordingly, an object of the invention is to provide new and improved web cassettes or cartridges. Here an object is to provide cassettes or cartridges which solve all of the above-stated problems in a simple, low cost, and straight forward manner.

Yet another object of the invention is to provide cassettes and cartridges which are adaptable to use in self-loading machines without simultaneously requiring expensive auto-loading mechanisms.

Still another object of the invention is to provide a combination of cassettes and cartridges so that the low cost of a cartridge may be realized, and yet the convenience of a cassette may be enjoyed.

In keeping with an aspect of this invention, these and other objects are accomplished by providing a cassette with supply and take-up cartridges mounted thereon. When a supply cartridge is mounted on the cassette, the web is pulled over guide posts or rollers and threaded into a take-up cartridge also mounted on the cassette. A section of the web spans a gap between the guide post or rollers. Therefore, when the cassette is mounted in a machine, the section of the web spanning the gap may be fed through the machine for processing without having to rely upon any part of the cassette to complete the machine.

The nature of a preferred embodiment of the invention may be understood best from a study of the attached drawings wherein:

FIG. 2 is a plan view of a cassette embodying the invention;

Figure 1:
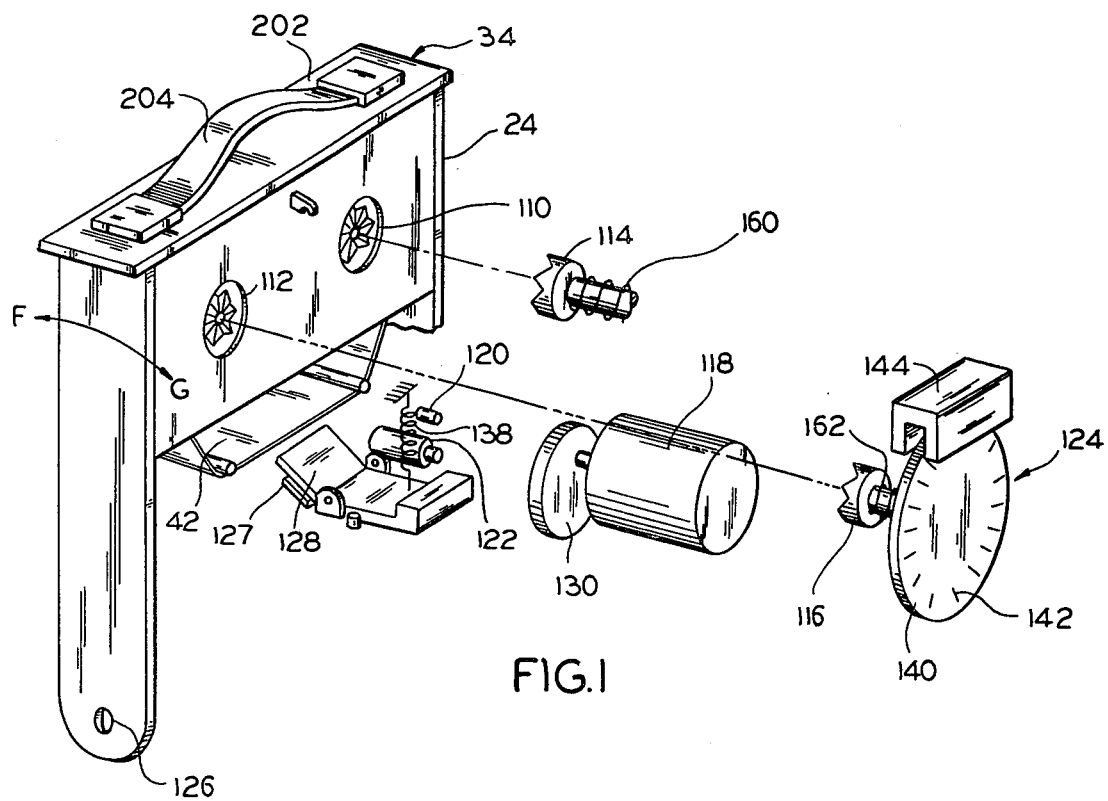
FIG. 1 shows an exemplary web cassette and associated parts of a machine for processing a web contained in the machine.

FIG. 1 is a perspective view of the inventive web cassette as used in conjunction with an associated machine. In this particular example, the associated machine is a microfilm camera, reader, or reader/printer described in the above-identified copending application. However, any other suitable machine may also be used.

This web transport means includes a cassette 34 carrying a preloaded cartridge containing a supply of the web following a path which emerges from the supply cartridge and then re-enters another take-up cartridge. The associated machine is operated responsive to an insertion of the cassette to engage the emerging web and to drive it past a format area or other web utilization station.

The major components in the web transport mechanism of the machine are a cassette receptacle and guidway 24, a pair of V-tooth couplings 110, 112, 114, 116, an AC motor 118, a capstan 120, pressure wheel 122, and a web transport speed detector 124. The machine stops prior to an insertion of the cassette. Then the guideway 24 swings in direction F on a pair of pivots (one of which is seen at 126) for loading and in direction G for operation of the machine. The supply cartridge containing a full reel of the web material 42 is associated with V-tooth coupler 112 and the take-up cartridge containing an empty reel is associated with coupler 110. When the cassette guide 24 is swung in direction G to the operating position coupler 110 meshes with coupler 114 and coupler 112 meshes with coupler 116.

At the time when the cassette 34 is loaded into the receptacle and guideway 24, the web transport mechanism is stopped and a pressure plate 127 and pressure plate carrier 128 are standing open. Also, pressure wheel 122 is moved away from capstan 120. Therefore, as carrier 24 swings in direction G, web 42 slips sideways under the pressure plate 127 and between the capstan 120 and pressure roller 122.

The positions of parts 127, 128 are controlled by a cam 130 which is contoured so that they are standing open while the web 42 is moving so that it will not be scratched.

More specifically, when the web, in this particular example, is being transported, the motor 118 takes one complete revolution after each function performed on the web. During a first 180° of that revolution, the capstan 120 is driven to advance the web 42 one frame length, and the pressure plate carrier 128 and pressure plate 127 are moved to the open positions. During the second 180° of that revolution, the capstan 120 and web 42 remain stationary while cam 130 rotates. At this time, the pressure plate carrier 128 moves to the closed position. The spring biased, floating pressure plate 127 holds the web 42 flat, in the format area. Therefore, as each function is performed on the web, the cam 130 rotates through the first 180°, to close the pressure plate carrier 128 responsive to the urging of spring 138. A solenoid (not shown) causes pressure roller 122 to push the web 42 against capstan 120.

The V-notch coupler 116 is connected to a web speed detector 124 which generates a signal for giving a low film signal. More specifically, attached to, and turning with, the web supply side, V-tooth coupler 116 is a transparent disc 140, with a plurality of marks 142 radially formed thereon. A light source and photocell combination 144 generates a pulse each time that a mark 142 passes therebetween, to cut the light falling on the photocell. As the supply reel becomes exhausted, it experiences a greater angular excursion for each web advance. Therefore, a greater number of pulses are generated by the photocell 144 responsive to each web advance. When a predetermined number of pulses are generate responsive to each web advance, a suitable end of web signal is given.

The cassette comprises a plate 200 having a generally L-shaped cross section. The short leg 202 of the L-shaped cross section has a handle 204 attached thereto. The long leg of the L-shaped cross section is a tray 204 which is divided in half by a central wall or stop member 206. As viewed in FIG. 2, the right-hand side of the tray 204 carries a supply cartridge 208 and the left-hand side carries a take-up cartridge 210. The cartridges terminate at their tops and bottoms in outstanding lips or edges 212, 214. Complimentary slide rails 216, 218 are formed on the tray 204 for capturing each of these lips when the cartridges 208, 210 slide sideways onto the tray. These slide rails preferably have an L-shaped cross section formed on tray 204. A double-ended leaf spring 220 attached to center wall 206 terminates in V-shaped detents or bends 222, 224 which snap into complimentary recesses 226, 228 molded into the cartridge walls. When the cartridges are slipped into their operating position, the detents 222, 224 snap into the recesses, and capture and hold the cartridges in their operating position.

Dependent from and supported by the tray 204 are a pair of guides or rollers 230, 232 for guiding and directing the web 42 from the supply cartridge 208 to the take-up cartridge 210. As supplied by the manufacturer, the web 42 is wound on a supply reel 211 in supply cartridge 208 and the end of the web 42 projects outwardly through a slot 234. When the web is a film, slot 234 is sealed by a suitable light sealing material 236, as here shown, by way of example. Accordingly, the end of the web 42 is pulled over guide rollers 232, 230, fed through slot 238 in cartridge 210, and into a capture slot 240 in the hub of take-up reel 242. A similar capture slot 244 is also formed in the hub of the supply reel 211.

Figure 3:
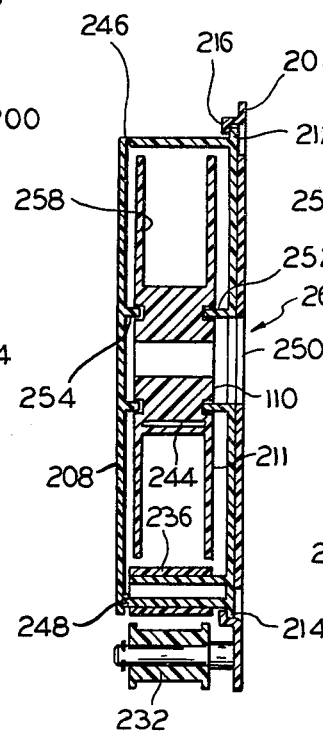
FIG. 3 is an end view of the cassette of FIG. 2 taken along the line 3—3 thereof.
Figures 4, 5:
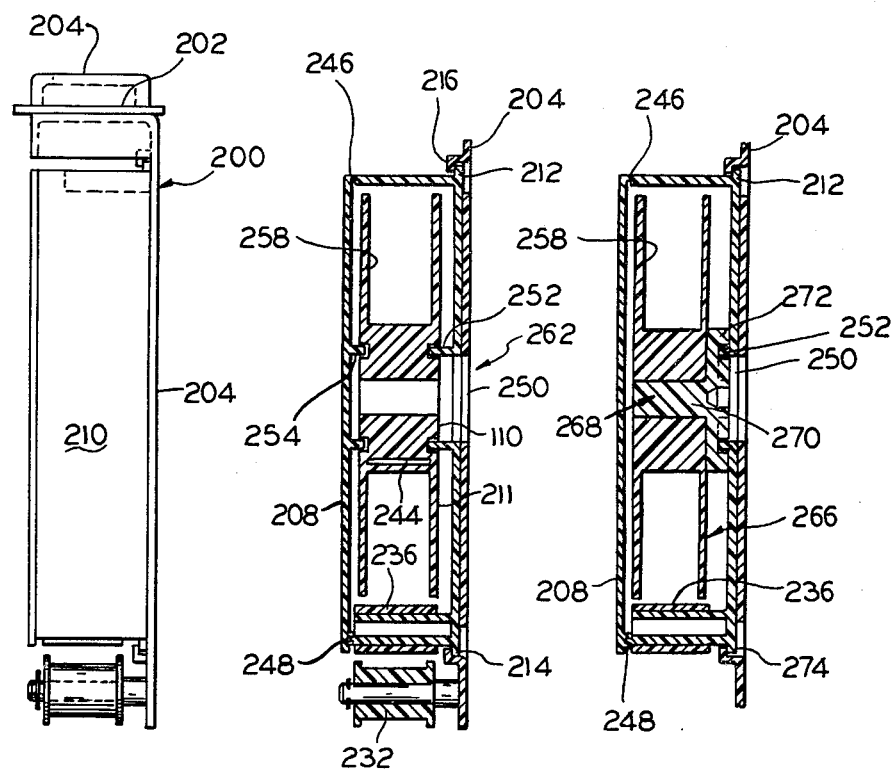
FIG. 4 is a cross section view of a first embodiment of the inventive cartridge, taken along line 4—4 of FIG. 2.
FIG. 5 is a similar cross section view of a second embodiment of the cartridge.

To facilitate the threading of the film into the take-up cartridge 210, it is made as seen in FIGS. 3 and 4. In greater detail, the cartridges 208, 210 are each a molded plastic box having a top integrally molded therewith. A thin part 246 at one edge of the box forms a hinge between the box and its top. All of the other three edges of the box and top have beaded channels 248 molded therein so that the cover snaps in place. Thus, the cover may be opened when the film led over roller 230 is connected to the take-up reel 242.

A hole 250 is formed in one side of each cartridge, and also corresponding holes are formed in cassette plate 204 to enable an entry of a web drive coupling. In order to provide a light seal between hole 250 and the film, opposed upstanding annuluses 252, 254 are molded in the cartridge walls. Mating annular recesses are molded into the reel. Therefore, there is no direct path for light to either pass or be reflected. The annuluses and recesses also form hub areas for supporting the reel 211.

The hub area 262 of the reel 211 has one half 110 of the V-tooth coupler molded therein. Therefore, when the cartridge carrier of FIG. 1 is swung in direction G, to a seated position, the other half 114 of the V-tooth coupler enters hole 250 and engages coupler 110.

The reel of FIG. 4 is a preferred reel for the web transport system disclosed herein. However, many industries have standardized on certain reel configurations 266 (FIG. 5). Therefore, there may be occasions when it is necessary or desirable to use these standardized reels 266, which often have square holes in the hub area to be mounted on square posts in the associated machines. It is difficult to fit these reels on the posts since the keyed hole and shaft must be perfectly aligned, and they tend to inadvertently turn.

According to the invention, a separate piece part 268 is provided in the form of a shaft 270 having a disc 272 integral with one end thereof. The shaft 270 has a generally square (or other suitable shaped) cross section to fit into the corresponding hole in the standard reel 266. The disc 272 contains V-teeth so that it may be fitted into the mating coupler 114 (FIG. 1).

The springs 160, 162 (FIG. 1) load the couplers 114, 116 in order to compensate for minor variances caused by manufacturing tolerances.

Those who are skilled in the art will readily perceive how the invention may be modified. Therefore, the appended claims are to be construed to cover all equivalent structures.

I claim:

1. A light-tight cartridge for either containing, supporting, and supplying unexposed film or for taking-up, supporting and containing exposed film responsive to a demand for delivery of film by a camera containing said cartridge, said cartridge comprising an integrally molded structure forming a light-tight enclosure defined by two relatively large side panels having surfaces held in a spaced parallel relationship by at least one closed wall interrupted by a slot, said wall being upstanding upon and projecting outwardly from one of said side panels, means formed around the perimeter of the other of said side panels for light-tight sealing against the outwardly projecting edges of said upstanding wall to form a light-tight seal between said perimeter and said projecting edges, at least one somewhat V-shaped recess formed in said upstanding wall to be captured by a cooperating detent formed in said camera, means associated with said one side panel for rotatably receiving a wound coil of film within the light-tight enclosure, the axis of said received coil being generally perpendicular to the surface of said one side panel, said slot being formed in said upstanding wall at a position which enables said rotatably mounted film to be drawn from or into said cartridge responsive to said film delivery demand by said camera, light-sealing means at said slot for enabling a passage of said film while precluding passage of light through said slot, and means formed on the outside of said cartridge for enabling said cartridge to be supported in either a film supply position or a film take-up position within said camera, whereby a cartridge loaded with unexposed film may be positioned at a supply position within said camera until the film loaded into said cartridge is substantially exhausted and then said exhausted cartridge may be moved to a take-up position in said camera for receiving exposed film after it is drawn from a freshly loaded cartridge in said supply position.

2. A light-tight cartridge for either containing, supporting, and supplying unexposed film or for taking-up, supporting, and containing exposed film responsive to a demand for delivery of film by a camera containing said cartridge, said cartridge comprising an integrally molded structure forming a light-tight enclosure defined by two relatively large side panels having surfaces held in a spaced parallel relationship by at least one closed wall interrupted by a slot, said wall being upstanding upon and projecting outwardly from one of said side panels, means formed around the perimeter of the other of said side panels for light-tight sealing against the outwardly projecting edges of said upstanding wall to form a light-tight seal between said perimeter and said projecting edges, said other large side panel being rectangular and connected along one side edge to said upstanding wall by means of a relatively thin plastic hinge which is thick enough to preclude a transmission of light therethrough, and said perimeter light-sealing means is a tongue and groove seal formed between the other three side edges of said other large side panel and the projecting edge of said closed wall, means associated with said one side panel for rotatably receiving a wound coil of film within the light-tight enclosure, the axis of said received coil being generally perpendicular to the surface of said one side panel, said slot being formed in said upstanding wall at a position which enables said rotatably mounted film to be drawn from or into said cartridge responsive to said film delivery demand by said camera, light-sealing means at said slot for enabling a passage of said film while precluding passage of light through said slot, and means formed on the outside of said cartridge for enabling said cartridge to be supported in either a film supply position or a film take-up position within said camera, whereby a cartridge loaded with unexposed film may be positioned at a supply position within said camera until the film loaded into said cartridge is substantially exhausted and then said exhausted cartridge may be moved to a take-up position in said camera for receiving exposed film after it is drawn from a freshly loaded cartridge in said supply position.

3. A cartridge as claimed in claim 1 or 2 wherein said coil of film is mounted on a reel, and wherein at least one of said large side panels includes centrally located means for turning said reel of film to deliver film from said coil when said cartridge is in a supply position or to take up said film on said coil when said cartridge is in a take-up position, and cooperating light seal means formed on said reel and at least one of said large side panels for precluding an entrance of light into said cartridge while enabling said turning means to rotate said reel freely within said cartridge.

4. The cartridge of claim 1 or 2 wherein said cooperating light seal means comprises opposed upstanding and recessed annuluses surrounding said centrally located reel-turning means, said upstanding annulus fitting into said recessed annulus when said reel is in place in said cartridge to prevent the formation of a path through which light may pass directly or be reflected into the interior of said cartridge.

5. The cartridge of claim 1 or 2 wherein said upstanding annulus is located on said one large side panel and said recessed annulus is located on said reel.

6. The cartridge of claim 1 or 2 wherein one of said opposed annuluses is located on a side of said reel, said turning means comprising one side of a V-toothed coupler positioned on said reel and centrally located inside said one annulus on said reel.

7. The cartridge of claim 1 or 2 wherein at least one of said large side panels extends slightly beyond said closed wall, thereby forming projecting lip edges which may be captured by cooperating fasteners in said camera.

* * * * *